April 12, 1938.  J. J. KANE ET AL  2,114,145

PIPE LINE PATCH

Filed July 19, 1935

Inventors
J. J. KANE
R. A. CHAMBERS.
Jesse R. Stone
Lester B. Clark
By
Attorneys Patented Apr. 12, 1938

2,114,145

UNITED STATES PATENT OFFICE 2,114,145

PIPE LINE PATCH

Joseph J. Kane, Galveston, and Raymond A. Chambers, Houston, Tex.; said Chambers assignor to said Kane Application July 19, 1935, Serial No. 32,172

3 Claims. (Cl. 138—99)

The invention relates to a pipe line patch, and particularly of the type which may be applied to existing pipe lines where corrosion or vibration has caused leaks to occur.

It is well understood that pipe lines such as oil or gas lines and lines for conducting other fluids, are usually buried in the earth and are subject to vibration, electrolysis and corrosion, so that leaks through the pipe and around the couplings are quite frequent.

In order to replace a section of pipe it is necessary to discontinue use of the line and the use of pipe line patches is, of course, increasing materially with the great pipe lines which are now spanning the country to conduct oil and gas from one locality to another.

Pipe lines of this general type are usually buried and it is necessary to excavate a considerable length of pipe in order to raise the pipe from the ditch so that it may be repaired with the present methods.

It is one of the objects of the invention to provide a patch assembly which may be applied to the pipe with a minimum of time and expense.

Another object of the invention is to provide a pipe line patch made up of upper and lower plates which overlap so that they may be welded along the longitudinal seams by an upwardly facing lap weld.

Another object of the invention is to provide a pair of overlapping plates to encircle the pipe in such a manner that the upper edge of the lower plate will provide a pocket to receive a bead of welding material to seal the plates together.

Another object of the invention is to provide overlapping plates to encircle the leaking area of the pipe so that the plates may be welded to the pipe and to each other in a most convenient manner.

Still another object of the invention is to provide a patch wherein one of the plates overlaps the edge of the adjacent plate so that the longitudinal welding of the plates may be accomplished from above.

Other and further objects of the invention will be readily apparent when the following description is considered in connection with the accompanying drawing wherein.

Figure 3:
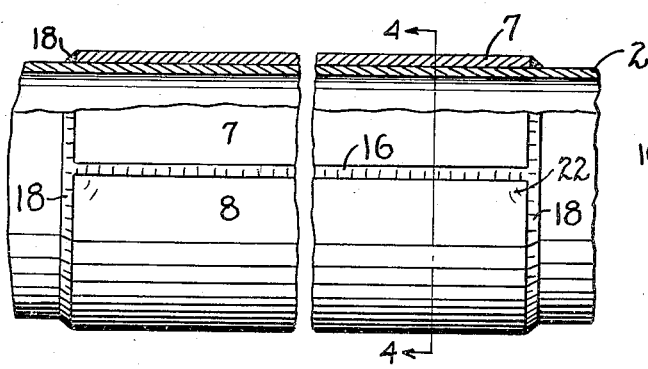
Fig. 3 is a longitudinal section of pipe which has been enclosed with the patch assembly, the upper portion of the pipe being broken away to show a sectional view.
Figure 4:
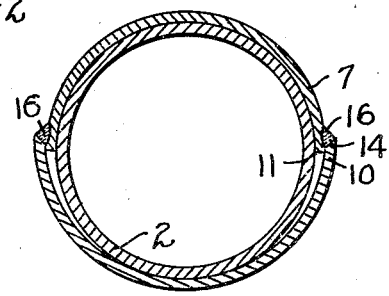
Fig. 4 is a section taken on the line 4—4 of Fig. 3 and looking in the direction of the arrows.
Figure 7:
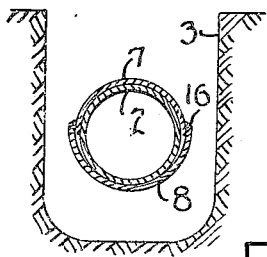
Fig. 7 is a diagrammatic view of a pipe positioned in a ditch and to which the patch has been applied.

The pipe 2 in Fig. 3 illustrates any pipe which may be leaking and to which a patch is to be applied. As previously pointed out, pipes of this type are usually buried in the earth and an excavation must be made in order to patch the leaking locations. If the entire pipe line is being reworked and patched, of course, the excavation continues along the entire line and the excavation will be of sufficient length to permit the pipe to be raised by a derrick or hoist to an elevation above the top of the ditch 3 which is illustrated diagrammatically in Fig. 7. Proper supports are then positioned under the pipe and across the ditch to support it while it can be conveniently patched. In some instances other pipe lines lie across the top of the pipe to be patched and it cannot be raised from the ditch. Where individual patches are to be applied to the pipe without a general overhauling of the line the line may not be excavated for a sufficient distance to raise the pipe from the ditch, but merely a small excavation may be made and the patch applied to the pipe.

With the previous patches a construction similar to that shown in the patent to Murray, 1,302,412 of April 29, 1919, is usually employed, wherein curved plates are fitted about the pipe and the edges butt-welded together in order to bond the plates to each other and to the pipe.

Figure 2:
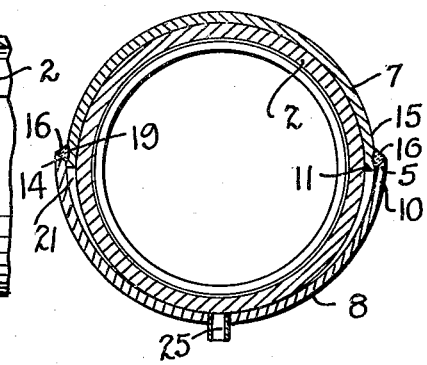
Fig. 2 is a transverse section taken on the line 2—2 of Fig. 1 and looking in the direction of the arrows.

The present improvement, however, avoids the butt weld along the longitudinal edges of the plates and provides an upwardly facing lap weld which is indicated generally at 5 in Fig. 2. To form this type of weld the upper plate or member 7 is fitted to the pipe 2 and is of substantially semi-circular configuration. It may be of any desired length to cover the leaking area and fits closely against the pipe.

Figure 5:
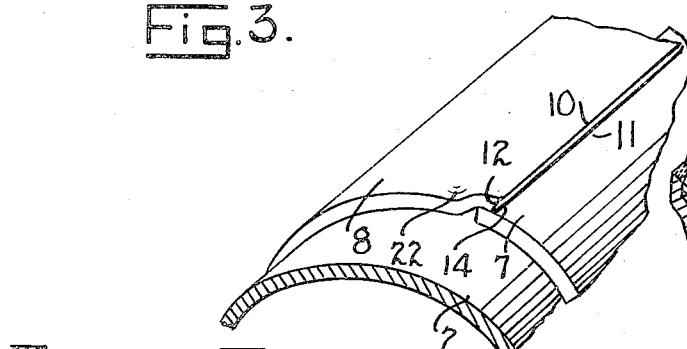
Fig. 5 is a broken detail view of the overlapping edge of the patch plates which has been turned to 90° for purposes of illustration to show the overlapping arrangement of the parts.

The lower patch plate or member 8 is also substantially semi-circular in configuration and fits about the pipe, but it is so curved that the edge 10 thereof overlaps the lower edge 11 of the top plate 7. It will be particularly noted that the edge face 12 of the lower section 8 is beveled inwardly as best seen in Fig. 5 where the welding material has not yet been placed in position. This beveled face 12, as seen in Fig. 2, slopes downwardly and inwardly to form a pocket 14 with the periphery of the upper plate 7. This pocket is, of course, upwardly facing so that the welder may very conveniently position the band or bead of welding material 16 therein.

It seems obvious that there is material advantage in performing a welding operation from the top so that molten material may be dropped in the pocket 14 until it solidifies, the advantage being obtained in the speed of welding and the quality of weld thus obtained.

As distinguished from this, a butt-weld to be made from the side or from below is more or less difficult because the molten material must be made to adhere to the parts and solidify in position against the face of the cavity. Needless to say, bottom or side butt-welds are slow and difficult to make and have been found to be much less satisfactory than a top weld such as here disclosed.

The ends of the plates 7 and 8, of course, fit quite closely to the periphery of the pipe 2 and will be bonded thereto by a band 18 of welding material which encircles the pipe. With this type of patch there is only a half circle at each end of the patch which must be a side or bottom weld and the top half of each end and the two longitudinal welds are upwardly faced welds or top welds which can be quickly and satisfactorily made. This results in a material saving in the cost of applying the patches and in a superior patch because of the fact that the top and bottom plates are securely and properly welded together by the weld 16.

As seen in Fig. 2 the welding material positioned in the pocket 14 will bond itself into both plates by the penetration of the welding material, as indicated at 19. In order that the end portion of the edges 10 may be drawn down to decrease the cavity 21 where the edge 10 overlaps the edge 11 the end portions of the plates 8 will be bent down at 22 so that the welding material at 23 will form a complete seal to enclose the ends of both the plates and at the same time form a bond with the periphery of the pipe 2. This bent down portion is best seen in Fig. 5 before the welding material has been positioned. This bending operation may be accomplished prior to positioning the plate or it may be accomplished by a heavy hammering after the plates have been located and initially positioned.

Figure 1:
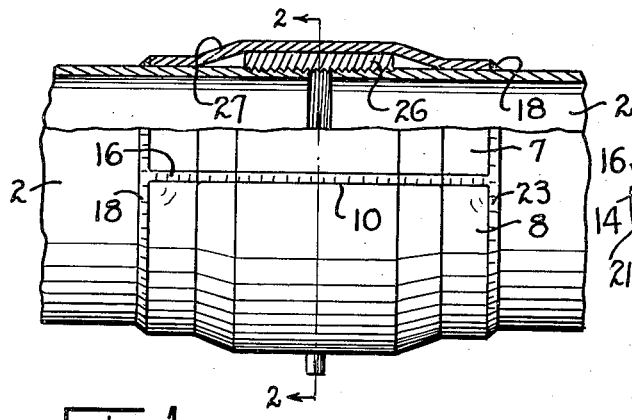
Fig. 1 is a side elevation of a leaking pipe line coupling about which the patch assembly has been positioned, a part of the pipe being broken away to show a sectional view.

A drain 25 is shown in the base of the plate 8 in Figs. 1 and 2, this drain being provided so that if there is a considerable volume of fluid leaking from the pipe that it may drain out of the vent while the weld is being formed so that it will not interfere with the welding operation. After the patch has been securely bonded and sealed then the vent may or may not be closed.

Fig. 1 shows the same arrangement as Fig. 3, except that the patch is positioned over a coupling 26. The arrangement of the plates is the same as previously described except that the plates are provided with a belled-out portion 27 in order to enclose the coupling 26.

Figure 6:
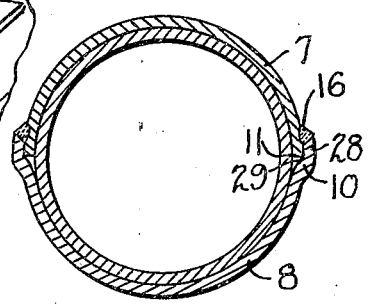
Fig. 6 is a transverse section of a slightly modified form of the overlapping connection of the upper and lower plates.

Fig. 6 shows a modified form of the device wherein the edges 10 of the plate 8 have been belled to provide an outstanding portion 28 which carries the upwardly directed face 12 as previously described. This construction is desirable because a shoulder 29 is formed against which the edge 11 may seat and the plates are thus definitely positioned about the pipe. The welding operation in this form of the invention will be the same as the others in that the longitudinal welds 16 are made along each side and the circumferential welds 18 are made around each end. As previously pointed out, this particular patch assembly is of advantage because the patch can be more readily applied and a majority of the welding operation is performed as an upwardly facing weld rather than an undercut weld or butt-weld. Patches can, therefore, be more quickly and economically positioned and the longitudinal welds which must resist expansion and contraction are more satisfactory welds because of the beveled face and pocket construction.

What is claimed is:

1. A patch assembly for pipes comprising a top section to lie against the pipe, a base section to lie against the pipe, the edges of said base section overlapping the edges of said top section, an undercut bevel on the upwardly facing edges of said base section, and welding material deposited in the pocket formed by said bevel face and the surface of said top section.

2. A pipe patch of the character described comprising overlapping curved plates to encircle the pipe to be patched, the edge of one plate overlapping the edge of the adjoining plate, an undercut bevel on the overlapping edge to form a pocket with the surface of the overlapped plate, welding material disposed in said pocket, a bead of welding material bonding the ends of the plates to the periphery of the pipe, the ends of the overlapping plate being drawn inwardly toward the pipe and sealed by said bead.

3. A pipe line patch to be positioned about a buried pipe line comprising a top plate to overlie the top half of the pipe, a lower plate to underlie the lower half of the pipe, the edges of the lower plate being upstanding and overlapping the edges of said top plate to form an upwardly facing top weld when covered with welding material, and a band of welding material about the ends of said plates, and a drain in said lower plate.

JOSEPH J. KANE.
RAYMOND A. CHAMBERS.